US006709100B2

(12) United States Patent
Kalbach

(10) Patent No.: US 6,709,100 B2
(45) Date of Patent: Mar. 23, 2004

(54) THREE-WAY EYEGLASSES RETAINER

(75) Inventor: Edward Van Lee Kalbach, Nibley, UT (US)

(73) Assignee: EK Ekcessories, Inc., Nibley, UT (US)

( * ) Notice: Subject to any disclaimer, the term of this patent is extended or adjusted under 35 U.S.C. 154(b) by 0 days.

(21) Appl. No.: 10/184,337

(22) Filed: Jun. 27, 2002

(65) Prior Publication Data

US 2004/0001179 A1 Jan. 1, 2004

(51) Int. Cl.[7] .................................................. G02C 3/00
(52) U.S. Cl. ........................................ 351/156; 351/157
(58) Field of Search ................................ 351/156, 157, 351/41

(56) References Cited

U.S. PATENT DOCUMENTS 1,819,738 A 8/1931 Daniel
2,481,946 A 9/1949 Pendleton
2,539,922 A 1/1951 Nyberg
2,660,092 A 11/1953 Bloom
2,704,961 A * 3/1955 Weil ........................... 351/157
3,397,026 A 8/1968 Spina
3,450,467 A 6/1969 Phillips
3,874,776 A 4/1975 Seron
3,879,804 A 4/1975 Lawrence
4,133,604 A 1/1979 Fuller
4,541,696 A 9/1985 Winger et al.
4,657,364 A 4/1987 Murrell
D290,964 S 7/1987 Kalbach
D291,894 S 9/1987 Weisenfeld et al.
4,696,556 A 9/1987 Perry, III
D309,619 S 7/1990 Kalbach
4,976,531 A 12/1990 Kahaney
4,978,210 A 12/1990 Lundbeck
5,002,381 A 3/1991 Murrell
5,015,085 A 5/1991 May
D320,367 S 10/1991 Kalbach
5,092,668 A 3/1992 Welch et al.
D328,908 S 8/1992 Kalbach
5,151,778 A 9/1992 Conley
5,157,425 A 10/1992 Liu
5,369,452 A 11/1994 Williams
D354,759 S 1/1995 Wolff
D354,760 S 1/1995 Wolff
5,575,042 A 11/1996 Kalbach
D382,503 S 8/1997 Kalbach
5,654,787 A 8/1997 Barison
5,860,191 A 1/1999 Sieger
D416,038 S 11/1999 Kalbach
6,000,795 A 12/1999 Van Rysselberghe
D418,774 S 1/2000 Kalbach
6,092,897 A 7/2000 Smerdon, Jr.
D432,401 S 10/2000 Kalbach
6,182,334 B1 2/2001 Davancens
D462,523 S 9/2002 Kalbach
D472,798 S 8/2003 Kalbach

FOREIGN PATENT DOCUMENTS

EP 0058772 12/1981
IT 502283 11/1954

OTHER PUBLICATIONS

Frames Catalog Harley Davidson Eyewear, p. 25, Jun. 1996.

* cited by examiner

*Primary Examiner*—Hung X. Dang
(74) *Attorney, Agent, or Firm*—TraskBritt

(57) ABSTRACT

A three-way eyeglass retainer having a retaining cord secured to a retaining member is disclosed. The retaining member is a hollow, tubular member with a cylindrical shape. A channel extends through the member and is defined by a wall fabricated from an elastic material. The channel communicates with the environment of the retaining member by an opening one or more of the ends of the retaining member. The channel further communicates with the exterior through a tunnel that is positioned transverse to the longitudinal axis of the retaining member. The tunnel communicates with the exterior through ports on either end of the tunnel that extend through the wall. A temple piece of a pair of eyeglasses may be inserted into the openings or the ports in the retaining member in various orientations to secure the eyeglasses to the person of a user.

22 Claims, 5 Drawing Sheets

Fig. 1
Fig. 2
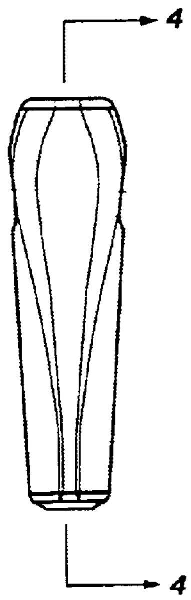
Fig. 3
Fig. 4
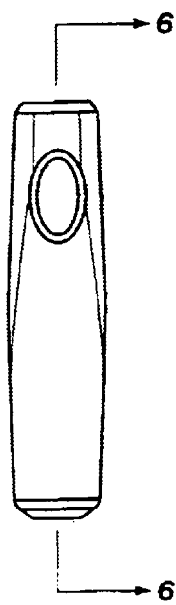
Fig. 5
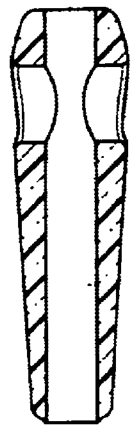
Fig. 6

THREE-WAY EYEGLASSES RETAINER

BACKGROUND OF THE INVENTION

1. Field of the Invention

The invention relates generally to accessories for use with eyeglasses. More particularly, the present invention is directed to structures for supporting eyeglasses about the user's head or neck.

2. State of the Art

Eyeglasses retainers of various constructions have been known for some time. Such retainers are usually one of two types. In a first construction, the retainer is directed to essentially storing eyeglasses which are not required for continual use by the wearer. In these constructions, the retainer includes an elongate cord having a means of interconnecting the cord to the frame members, or temple pieces, on a pair of eyeglasses. In many constructions, the means used to interconnect the cord to the eyeglass frames is secured to both opposing ends of the cord. The cord is typically an inelastic structure and is dimensioned to essentially form a necklace about the user's neck with the eyeglasses being positioned on the user's chest as the retainer hangs about the user's neck.

Owing to the size of the user's head and given the fact that the retainer assembly must pass over the user's head in order to reach its operative location, the cord of such retainers has typically been dimensioned to be relatively long. It follows that in many instances the eyeglasses will rest at a location down the user's chest which may not be particularly comfortable or visually attractive. With this disadvantage in mind, many constructions of retainers have adopted the use of a slider positioned on the retainer cord. In those retainer structures which utilize a slider, the cord is oftentimes passed through one channel of the slider and thereafter doubled back on itself and passed through a parallely positioned channel. As the slider is moved along the length of the cord, the effective length of the cord which forms the operative necklace portion of the retainer is dimensionally reduced. This in turn results in the eyeglasses being positioned higher on the user's chest in a more desirable location.

In a second construction of eyeglasses retainers, the eyeglasses are held operationally in place on a user's head. For example, many athletes and outdoor enthusiasts will utilize such retainers during the course of athletic or outdoor activities to firmly hold their eyeware in place against dislodgment which would otherwise occur during periods of physical exertion or outdoor activity. In these constructions, the inelastic cord as previously described may be replaced by an elastic band. The use of the elastic band permits the user to position the retainer about his head and thereby apply a retaining force to the eyeglass frame for purposes of retaining the eyeglasses in an operational position.

BRIEF SUMMARY OF THE INVENTION

The present invention includes an elongate member which defines a hollow interior channel which extends along a length of the elongate member. The channel communicates with the environment through a first port defined in the exterior surface of the elongate member. A second port, may also be defined within a sidewall of the elongate member, to communicate with the interior channel. A third port may also be defined within the sidewall of the elongate member to communicate with the interior channel.

In a preferred construction, the first port is defined in a first end of the elongate member. The second port is defined in a first sidewall of the elongate member and the third port is defined in a second sidewall of that member. The second port is preferably positioned in a sidewall which is positioned oppositely from the second sidewall whereby the third port is positioned oppositely from the second port.

The elongate member is formed from a flexible, resilient material which permits the body of the elongate member to flex to accommodate the positioning of a more rigid member within one or more of the identified ports. The flexible material is preferably one having a high coefficient of friction associated therewith such that upon the insertion of the more rigid member through one or more of the referenced ports and into the interior channel, the elongate member tends to releasably abut or adhere itself against the exterior surface of the more rigid member and form a pressure fit union with the more rigid member.

The elongate member may include attachment structure for securing the elongate member to a retaining member such as a cord.

In one configuration of the invention, two elongate members are interconnected to one another by means of an attachment structure secured to each respective elongate member and extending therebetween in this configuration, the elongate members are sized to permit the insertion and retention of portions of a pair of eyeglasses into the interior channel defined within the body of the elongate member. The ports are positioned in this particular embodiment may be defined within the body of the elongate member to facilitate the positioning of the portions of the pair of eyeglasses simultaneously within one or more of the ports. The flexible nature of the elongate member permits that member to flex and other bend to facilitate the insertion and retention of the portions of the pair of eyeglasses within one, two or three of the ports of a selected elongate member. The positioning of the ports within the elongate member permits the pair of eyeglasses to be retained in the elongate member (s) in a variety of retention configurations.

BRIEF DESCRIPTION OF THE SEVERAL VIEWS OF THE DRAWINGS

The nature of the present invention as well as other embodiments of the present invention may be more clearly understood by reference to the following detailed description of the invention, to the appended claims, and to the several drawings herein, wherein:

FIG. 1 is a perspective view of a retaining member of the present invention;

FIG. 2 is a top view of the retaining member of FIG. 1;

FIG. 3 is a front view of the retaining member of FIG. 1;

FIG. 4 illustrates a cross sectional view of the retaining member shown in FIG. 3 along line 4—4;

FIG. 5 is a side view of the retaining member of FIG. 1;

FIG. 6 illustrates a cross sectional view of the retaining member shown in FIG. 5 along line 6—6;

Figures 7, 8, 9, 10, 11:
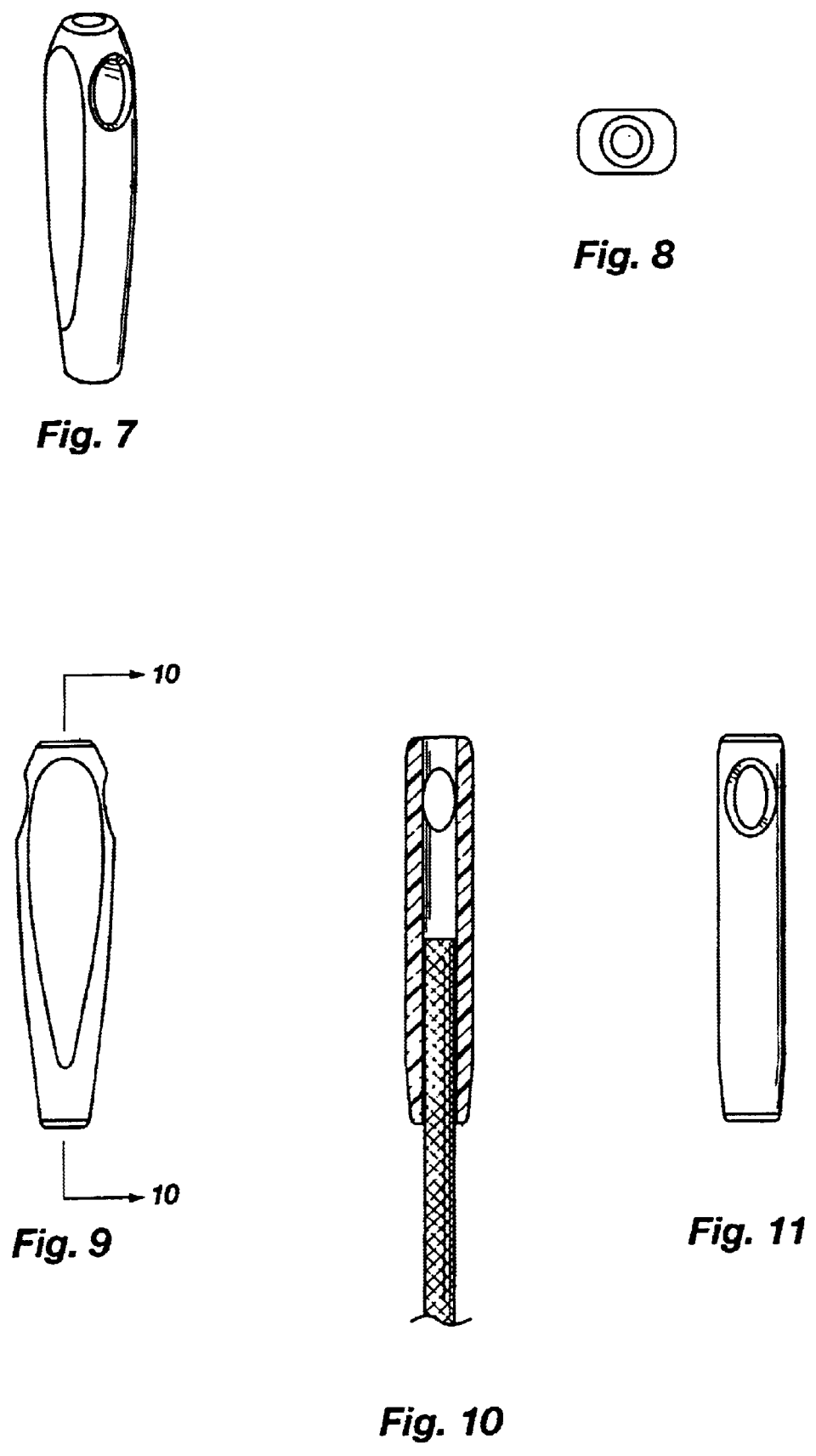

FIG. 7 is a perspective view of the retaining member of FIG. 1 with a modified surface;

FIG. 8 is a top view of the retaining member of FIG. 7;

FIG. 9 a front view of the retaining member of FIG. 7;

FIG. 10 illustrates a cross sectional view of the retaining member shown in FIG. 9 taken along section line 8—8 with a retaining cord inserted in one end thereof;

FIG. 11 is a side view of the retaining member of FIG. 7;

DETAILED DESCRIPTION OF THE INVENTION

Figure 12:
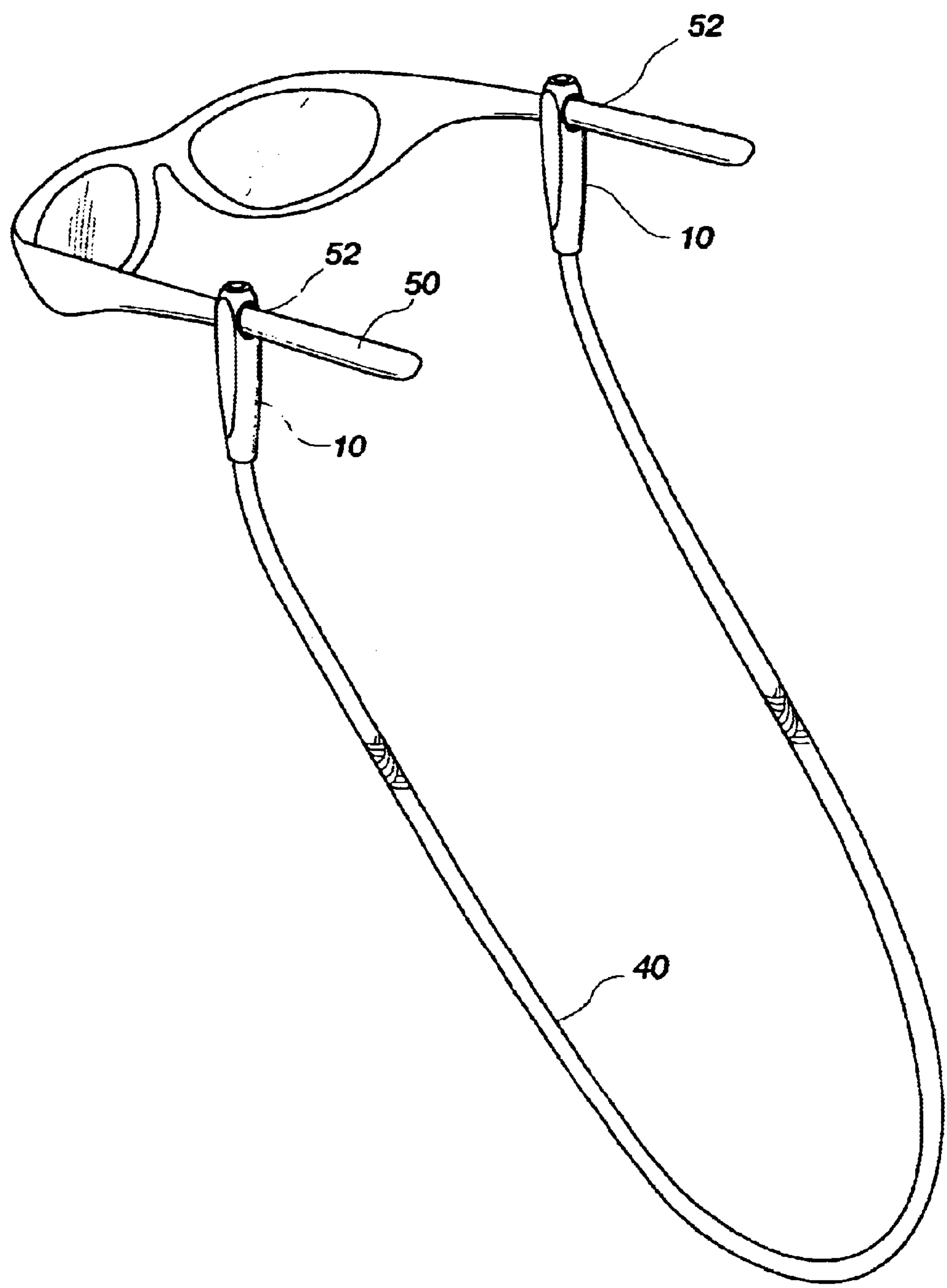
FIG. 12 is a perspective view of an eyeglasses retainer of the present invention attached to a pair of eyeglasses in a first attachment orientation.

The instant invention is directed to a retainer construction adapted to receive and retain an article having some degree of rigidity. The invention finds one application as a retainer for use in retaining a pair of eyeglasses about the person of a user. Although the present description is directed to this particular application, it should be understood that the invention may find application in a number of different environments and the illustration of the invention in the context of an eyeglass retainer should not be considered to be a restriction on the possible use environments of the invention. It should therefore be understood that while the present invention is described in terms of certain specific, exemplary embodiments, the specific details of these embodiments are set forth in order to provide a thorough understanding of the present invention. It will be apparent, however, that the present invention may be practiced in various combinations of the specific, exemplary embodiments presented herein.

As illustrated, the invention contemplates an eyeglasses retainer that allows a user to secure a pair of eyeglasses to the person of a user. The invention may include two elongate retainer structures which are interconnected by a connection structure which extends between the two retainer structures.

Referring now to the drawing figures, FIG. 1 is a perspective view of a retaining member of the present invention shown generally at 10. As more clearly shown in FIGS. 2 through 11, the retaining member 10 may be constructed as a hollow tube with a generally cylindrical shape having a first end 20 and a second end 22. The retaining member 10 defines a longitudinal axis 32 which extends along its length. A wall 12 of the retaining member 10 is fabricated from resilient material, e.g. rubber, and defines a hollow, interior channel 14 which extends through the length of the retaining member 10. The channel 14 extends co-axially along the axis 32 of the retaining member 10. The channel 14 may be configured in a generally cylindrical shape. Although the illustrated cylindrical shape is preferred alternative shapes may also be utilized. In the illustrated embodiment, a diameter of the channel 14 is substantially constant over the entire length of the retaining member 10.

The channel 14 communicates with the exterior surface of the retaining member 10 by a number of ports or access openings. The channel 14 communicates with the exterior surface of the retaining member 10 and hence to the environment on a first end 20 of the retaining member 10, through a circular opening 16. Similarly, the channel 14 communicates with the exterior surface of the retaining member 10 and hence the environment on a second end 22 of the retaining member 10 through a circular access opening 17. Although the illustrated embodiment depicts circular openings 16 and 17, it should be appreciated that the openings on the ends 20 and 22 of the retaining member 10 may be configured in a variety of configurations. Each of these configurations is intended to be encompassed by the present invention.

The channel 14 further communicates with the exterior surface of the retaining member 10 through a first port 24A, having a longitudinal axis 31, and a second port 24B, having a longitudinal axis 33. The first port 24A and the second port 24B which are each defined in a sidewall 12 of the retaining member 10. Referring to FIG. 3 the two ports 24A and 24B may be seen to form a passageway or tunnel 28. The tunnel 28 defines a first axis 30 that extends along the length of that tunnel. The tunnel 28 is oriented transverse to the longitudinal axis 13 of the channel 14. In the illustrated embodiment, the tunnel 28 is depicted being oriented orthogonal, i.e. substantially perpendicular, to a second axis 32 of the channel 14. Thus, the tunnel 28 is positioned orthogonal to the channel 14. Although the ports 24A and 24B are illustrated having a generally oval configuration, it should be understood that the ports may be configured in a variety of configurations without departing from the spirit of the present invention.

In the illustrated embodiment, the portion of the wall 12 located proximate the first end 20 of the retaining member 10 is dimensioned thicker than the portion of the wall 12 located proximate the second end 22 of the retaining member 10. This dimensioning gives the retaining member 10 a tapered shape wherein a width of the retaining member 10 at the first end 20 is wider than the width of the retaining member 10 at the second end 22.

Referring now to FIG. 7, there is shown a perspective view of the retaining member 10. It should be appreciated that an exterior surface of the retaining member 10 may have various topographic features formed thereon, all of which are meant to be encompassed by the present invention. For example, as illustrated in FIG. 7, the exterior surface of the retaining member 10 may define a flat planar region 34, and as further illustrated in FIG. 11, the retaining member 10 may define an opposing flat planar region 34 on the exterior surface. It will be apparent that the flat planar region 34 of the retaining member 10 may be positioned in use to correspond to a side of a user's head when the retaining member 10 is in use thereby providing added comfort to the user.

As illustrated in FIG. 10, a cross sectional view of the retaining member 10 of FIG. 9 taken along section line 8—8 is shown. The cross-sectional view of the retaining member illustrates a retaining cord 40 inserted in the second end 22 of the retaining member 10. In this particular construction, the second end 22 of the retaining member 10 functions as a securement or attachment structure for securing the cord to the retaining member 10. Although the retaining cord 40 is described herein as a cord, it will be apparent that any elongated structure that performs functions the same as, or equal to, the retaining cord 40 is intended to be covered by the present invention (e.g., rope, braid, webbing, leather strap, nylon climbing cord). The channel 14 and retaining cord 40 are dimensioned such that insertion of the retaining cord 40 into the channel 14 causes the wall 12 to expand. Due to the elastic property of the material used to construct the retaining member 10, the wall 12 exerts constrictive forces on the retaining cord 40 to securely attach the retaining member 10 to the retaining cord 40. It will be apparent that the securing of the retaining cord 40 to the retaining member 10 may be enhanced by the use of an adhesive (not shown), by heat shrinking the retaining member 10 about the cord 40 or using any other means as is well known to those of ordinary skill in the art to secure the cord 40 within the body of the retaining member 10.

Although the channel 14 of the retaining member 10 as described and illustrated herein as substantially extending an entire length of the retaining member 10 in an alternative embodiment the channel 14 may not extend the entire length. For example, the channel 10 may have a barrier formed therein, such as an inner wall or plug, (not shown) located in the channel 14 that separates the channel 10 into two or more compartments (not shown) Alternatively, the channel 14 may extend only partially through the length of the retaining member 10. In this alternative constructions the cord 14 may be attached to the retaining member 10 by stricture which does not include the use of the channel 14, e.g. adhesives securing the cord directly to the body of the retaining member 10.

The present invention provides a retaining member 10 which may be combined with a retaining cord 40 and used to retain a pair of eyeglasses 50 about the user's head. The use of the retaining member 10 described herein with multiple openings 14 and ports 24*aa* and 24B in conjunction with the retaining cord 40 provides the user with an eyeglasses retainer that may be used to secure eyeglasses in at least three different orientations, with each orientation providing distinct user features.

Referring now to FIG. 12, there is illustrated a perspective view of a three-way eyeglasses retainer of the present invention shown attached to a pair of eyeglasses 50. The three-way eyeglasses retainer includes two retaining members 10 attached to the retaining cord 40 as previously described herein with reference to FIG. 11. As illustrated, the retaining cord 40 is inserted into the second end 22 of the retaining member 10 while a temple piece 52 of the eyeglasses 50 is inserted proximate the first end 20 of the retaining member 10. A first attachment orientation is illustrated wherein a temple piece 52 of the pair of eyeglasses is inserted into the retaining member 10 first through port 24A , subsequently through the channel 14 and thereafter through port 24B (See FIG. 6). The structure of the temple piece thereby extends through the retaining member 10 along the axis 30 of the tunnel 28 and is positioned parallel to the axis 32 of the tunnel 28 and orthogonal to the axis 32 of the channel 14. As indicated, the opening 16 on the end 20 of the retaining member 10 is not utilized in this attachment orientation. Because the temple piece 52 is positioned orthogonally to the axis 32 of the channel 14 in the retaining member 10 and is inserted through the ports 24, the retaining member 10 is able to slide along the temple piece 52. The first attachment orientation is ideal for users who arc continually taking their eyeglasses 50 on and off. To aid in the sliding of the retaining member 10 along the temple piece 52, it may be advantageous to wet the temple piece 52 or the retainer assembly 12 with water or other liquid.

Figure 13:
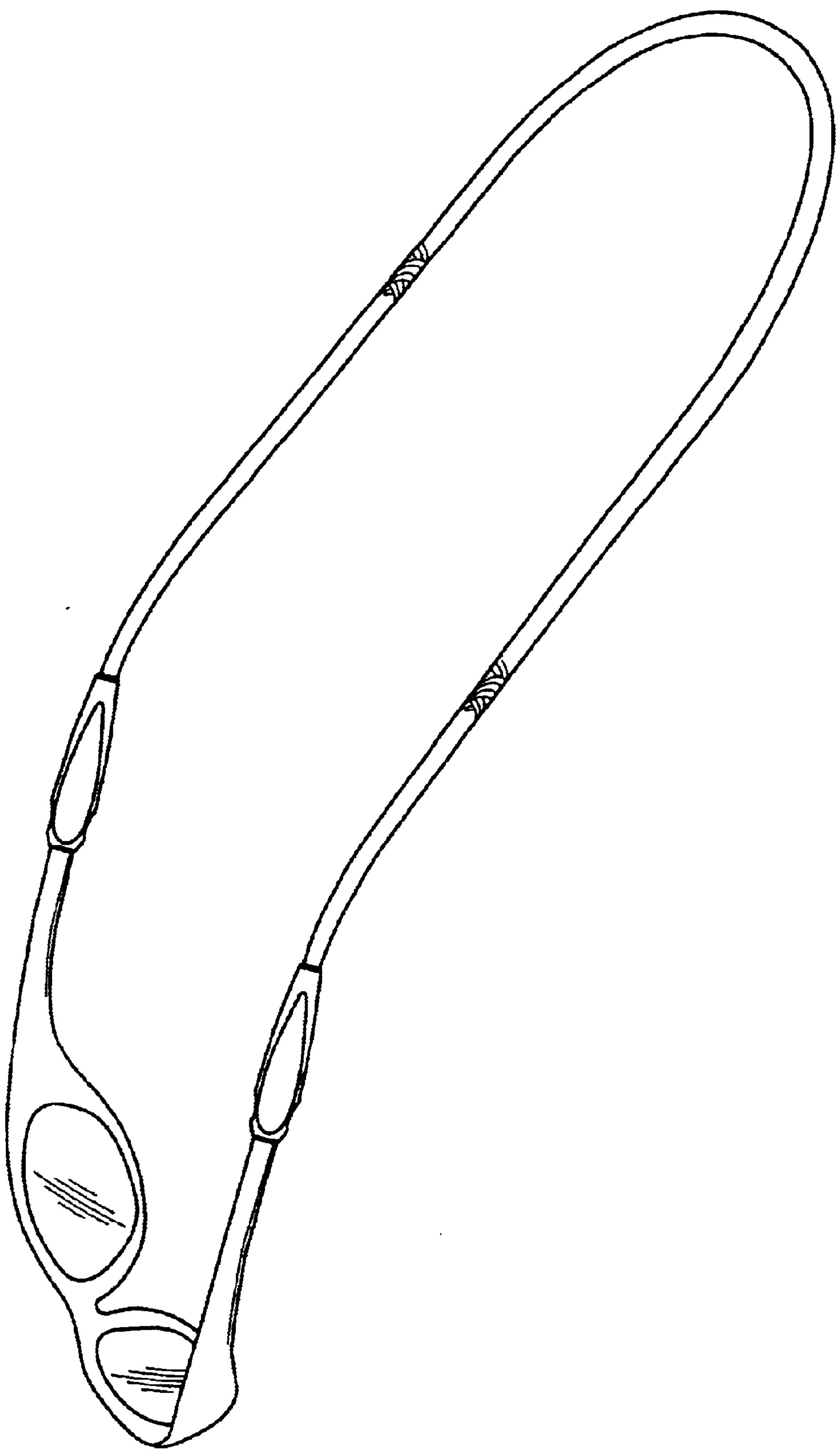
FIG. 13 is a perspective view of an eyeglasses retainer of the present invention attached to a pair of eyeglasses in a second attachment orientation.

FIG. 13 shows a perspective view of the three-way eyeglasses retainer attached to the eyeglasses 50 in a second attachment orientation. As illustrated, the temple piece 52 is inserted into the opening 16 of the retaining member 10, generally in a direction co-axial with the longitudinal axis 32 of the channel 14. The temple piece 52 extends into and occupies the channel 14. In this orientation, the temple piece 52 extends along the axis 32 of the channel 14 and is positioned orthogonal to the axis 30 of the tunnel 28 thereby leaving the ports 24A and 24B unoccupied or empty. The second attachment orientation contributes to the eyeglasses 50 remaining secure during an activity in which the user participates.

Figure 14:
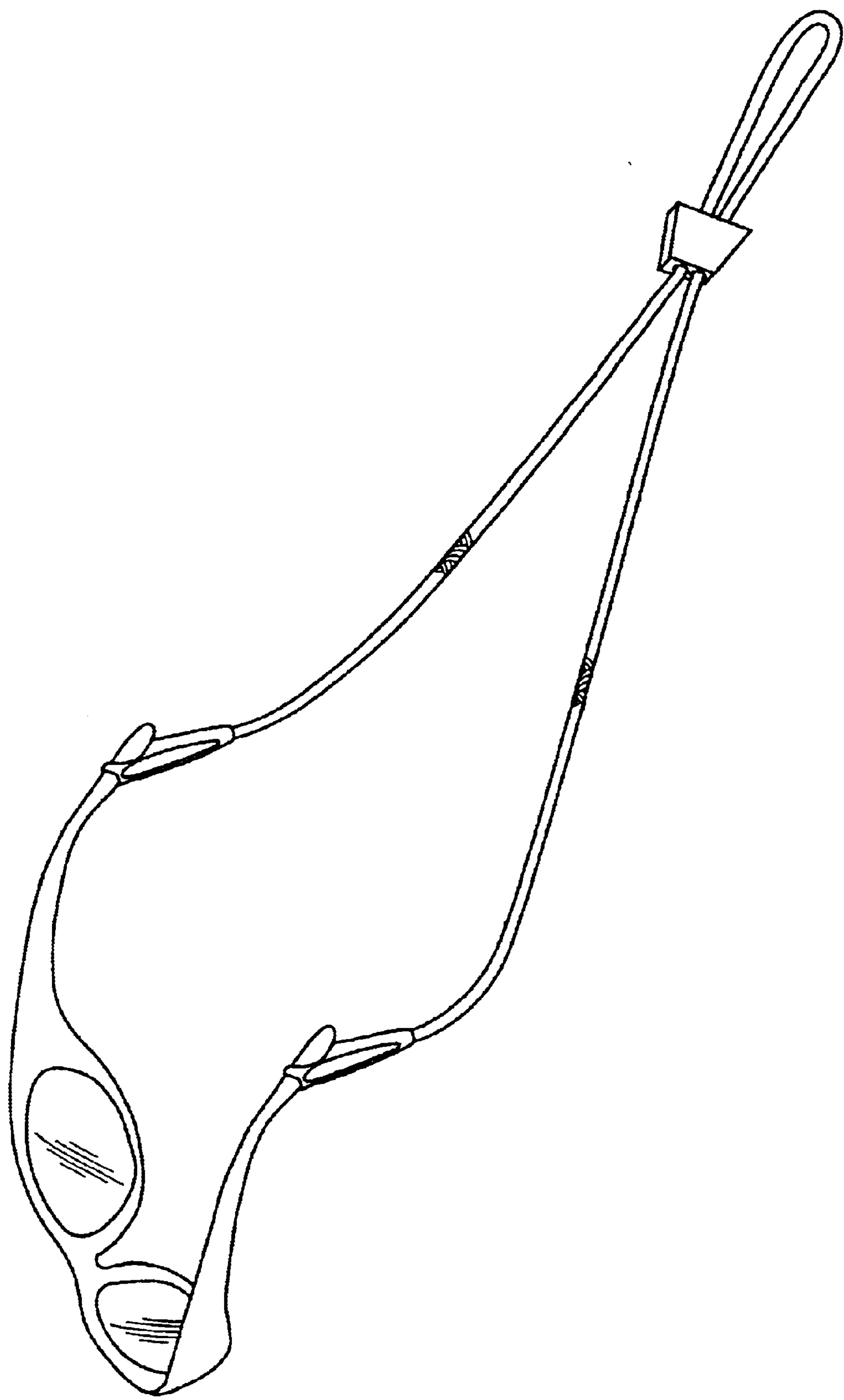
FIG. 14 is a perspective view of an eyeglasses retainer of the present invention attached to a pair of eyeglasses in a third attachment orientation.

The three-way glasses retainer being attached to the eyeglasses 50 in a third attachment orientation is shown in a perspective view in FIG. 14. In this attachment orientation the temple piece 52 is initially inserted into the opening 16 of the retaining member 10 and thereafter the tip of the temple piece is directed to exit the retaining member 10 through one of the ports 24A or 24B. Notably, in this attachment orientation, portions of the body of the retaining member 10 may be bent or otherwise displaced in order to facilitate the placement described. As illustrated, the temple piece 52 may extend substantially diagonally to the axis 32 of the channel 14 and the axis 30 of the tunnel 28. FIG. 14 illustrates the use of a slider 54 in conjunction with the cord 40 for use in cinching the retainer cord 40 to the user's head. Similar slider constructions 54 may also be used in the embodiments depicted in FIG. 12 and FIG. 13.

In the illustrative embodiments described herein the retaining member 10 is fabricated from an elastic material, such as rubber, or a synthetic material which duplicates the elastic properties of rubber and makes the retaining member 10 resilient. The elastic material possesses a high coefficient of friction such that when a portion of the temple piece 52 or the retaining cord 40 is inserted into one the openings 16 or ports 24 of the retaining member 10, not only does the retaining member 10 and hence the channel 14 and tunnel 28 dimensionally expand to receive the portion of the temple piece 52 or retaining cord 40 but furthermore, the interior sidewall of the wall 12 is abutted against the temple piece 52 or retaining cord 40 to produce an interface which exhibits a high coefficient of friction between the retaining member 10 and the temple piece 52 or retaining cord 40. It follows that the various ports, access openings as well as the channel 14 and the tunnel 28 may be dimensioned to be slightly smaller than the portions of the eyeglasses which are intended to be inserted into or through those ports, access openings and channels. As the temple piece 52 or retaining cord 40 is inserted into the channel 14 or the tunnel 28, the retaining member 10 is stretched and placed in tension, which in turn affects a pressure fit union of the retaining member 10 with the temple piece 52 or the retaining cord 40.

When the user desires to detach the temple piece 52 from the retaining member 10, the user simply places his/her fingers on the retaining member 10 and pushes the retaining member 10 outwardly away from the temple piece 52. Should the user attempt to pull the temple piece 52 away from the retaining member 10, the nature of the retaining member's 10 constructions causes the retaining member 10 to constrict even tighter about the temple piece 52, strengthening the pressure fit and enhancing the ability of the retaining member 10 to retain the eyeglasses 50.

Although the present invention has been shown and described with respect to various illustrate embodiments, various additions, deletions and modifications that are obvious to a person of ordindinary skill in the art to which the invention pertains, even if not shown or specifically described herein, wherein, are deemed to lie within the scope of the invention as encompassed by the following claims.

What is claimed is:

1. A retaining member for attaching a retainer cord to a temple piece of a pair of eyeglasses, said retaining member comprising:

an elongate member, fabricated from an elastic material, which defines a hollow channel through a length thereof, said hollow channel communicating with an exterior of said elongate member by a first opening in a first end of said elongate member; said elongate member further defining a first port in a sidewall of said elongate member which communicates with said hollow channel, said first opening, said hollow channel and said first port being dimensioned to define a passageway to slidably receive and retain a portion of said temple piece of said pair of eyeglasses; said elongate member further defining a second port in said sidewall, said second port being positioned within said sidewall oppositely from said first port, said first opening said hollow channel and said second port being dimensioned to define a second passageway to slidably receive and retain a portion of said temple piece of said pair of eyeglasses, said first port, said hollow channel and said second port being dimensioned to define a third passageway to slidably receive and retain a portion of said temple piece of said pair of eyeglasses; and attachment structure associated with said elongate member for securing said retainer cord to said elongate member.

2. The retaining member of claim 1 further comprising a second elongate member configured similar to said elongate member; a second attachment structure associated with said second elongate member for securing said retainer cord to said second elongate member and a retainer cord secured to each of said elongate members by said attachment structure and said second attachment structure.

3. The retaining member of claim 1, wherein said channel defines a first longitudinal axis, said first port defines a second longitudinal axis and said second port defines a third longitudinal axis, said first longitudinal axis being oriented perpendicular to said second longitudinal axis.

4. The retaining member of claim 1 wherein said channel defines a first longitudinal axis, said first port defines a second longitudinal axis and said second port defines a third longitudinal axis, said first longitudinal axis being oriented perpendicular to said third longitudinal axis.

5. The retaining member of claim 1 wherein said channel defines a first longitudinal axis, said first port defines a second longitudinal axis and said second port defines a third longitudinal axis, said first longitudinal axis being oriented perpendicular to said second longitudinal axis and said first longitudinal axis being oriented perpendicular to said third longitudinal axis.

6. The retaining member of claim 1, wherein said elongate tubular member tapers from a larger width on said first end to a smaller width on said second end.

7. The retaining member of claim 1, further comprising at least one flat surface on an exterior surface of said retaining member.

8. The retaining member of claim 1, wherein said channel defines a first longitudinal axis, said first port defines a second longitudinal axis and said second port defines a third longitudinal axis, said second longitudinal axis being oriented parallel to said third longitudinal axis.

9. The retaining member of claim 8, wherein said second longitudinal axis is oriented coaxially to said third longitudinal axis.

10. The retaining member of claim 1, wherein said first port has an oval shape.

11. An eyeglass retainer comprising:

a retaining cord;

a hollow, elongate member with a tubular shape fabricated from an elastic material having a first end and an opposing second end, said elongate member including a cylindrical sidewall that defines a hollow channel, wherein said channel communicates with an exterior of said elongate member by a first opening in said first end and a second opening in said second end, wherein said channel further communicates with the exterior by a first port defined in said cylindrical wall; said first opening, said hollow channel and said first port being dimensioned to define a passageway to slidably receive and retain a portion of said temple piece of said pair of eyeglasses; said elongate member further defining a second port in said sidewall, said second port being positioned within said sidewall oppositely from said first port, said first opening, said hollow channel and said second port being dimensioned to define a second passageway to slidably receive and retain a portion of said temple piece of said pair of eyeglasses, said first port, said hollow channel and said second port being dimensioned to define a third passageway to slidably receive and retain a portion of said temple piece of said pair of eyeglasses; and wherein said retaining cord is positioned within said second opening and attached to said hollow elongate member.

12. The eyeglass retainer of claim 11, wherein the retaining cord is attached to the hollow, elongate member by adhesive.

13. The eyeglasses retainer of claim 11, wherein said hollow channel defines a first longitudinal axis, said first port defines a second longitudinal axis and said second port defines a third longitudinal axis, said first longitudinal axis being oriented perpendicular to said second longitudinal axis.

14. The eyeglasses retainer of claim 11, further comprising a slider slidably attached to said retaining cord.

15. The eyeglasses retainer of claim 11, wherein said hollow, elongate member further comprises a barrier located within said channel, wherein said barrier divides said channel into at least two compartments.

16. The eyeglasses retainer of claim 11, wherein said first port is located proximate said first end and said retaining cord is slidably received in said second opening.

17. The eyeglasses retainer of claim 11, wherein said first port has an oval shape.

18. The eyeglasses retainer of claim 11, wherein said first and second openings have a circular shape.

19. The eyeglasses retainer of claim 11, wherein said hollow channel defines a first longitudinal axis, said first port defines a second longitudinal axis and said second port defines a third longitudinal axis, said first longitudinal axis being oriented perpendicular to said third longitudinal axis.

20. The eyeglasses retainer of claim 19, wherein said hollow channel defines a first longitudinal axis, said first port defines a second longitudinal axis and said second port defines a third longitudinal axis, said first longitudinal axis being oriented perpendicular to said second longitudinal axis.

21. The eyeglasses retainer of claim 11, wherein said hollow channel defines a first longitudinal axis, said first port defines a second longitudinal axis and said second port defines a third longitudinal axis, said second longitudinal axis being oriented parallel to said third longitudinal axis.

22. The eyeglasses retainer of claim 11, wherein said hollow channel defines a first longitudinal axis, said first port defines a second longitudinal axis and said second port defines a third longitudinal axis, said second longitudinal axis being oriented coaxially to said third longitudinal axis.

* * * * *

UNITED STATES PATENT AND TRADEMARK OFFICE

CERTIFICATE OF CORRECTION

PATENT NO. : 6,709,100 B2

DATED : March 23, 2004

INVENTOR(S) : Edward Van Lee Kalbach

It is certified that error appears in the above-identified patent and that said Letters Patent is hereby corrected as shown below:

<u>Drawings,</u>

Sheet 1 of 5 (containing FIGS. 1-6) Replacement sheet showing all reference numerals

Fig. 1

Fig. 2

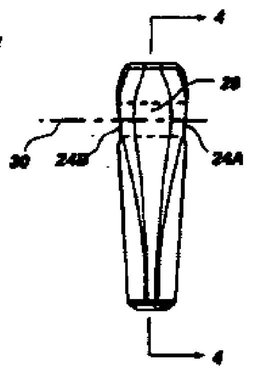

Fig. 3

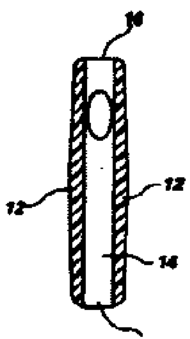

Fig. 4

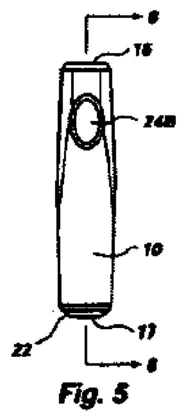

Fig. 5

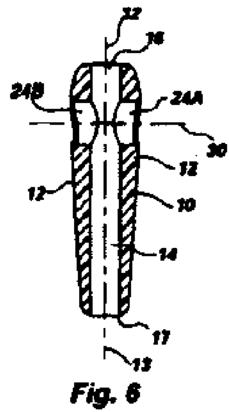

Fig. 6

UNITED STATES PATENT AND TRADEMARK OFFICE

CERTIFICATE OF CORRECTION

PATENT NO. : 6,709,100 B2
DATED : March 23, 2004
INVENTOR(S) : Edward Van Lee Kalbach It is certified that error appears in the above-identified patent and that said Letters Patent is hereby corrected as shown below:

Drawings (cont'd),

Sheet 2 of 5 (containing FIGS. 7-11) Replacement sheet showing all reference numerals In Fig. 9, reference numeral "10" (two occurrences appearing next to the section line arrow points) is changed to reference numeral -- 8 -- indicating section line 8-8

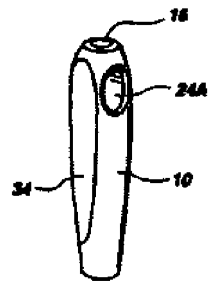

Fig. 7

Fig. 8

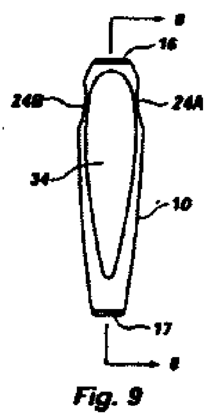

Fig. 9

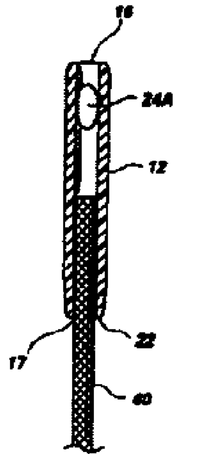

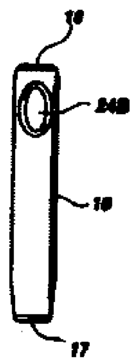

Fig. 11

Fig. 10

UNITED STATES PATENT AND TRADEMARK OFFICE
CERTIFICATE OF CORRECTION

PATENT NO. : 6,709,100 B2
DATED : March 23, 2004
INVENTOR(S) : Edward Van Lee Kalbach It is certified that error appears in the above-identified patent and that said Letters Patent is hereby corrected as shown below:

Drawings (cont'd),
Sheet 4 of 5 (containing FIG. 13) Replacement sheet showing all reference numerals

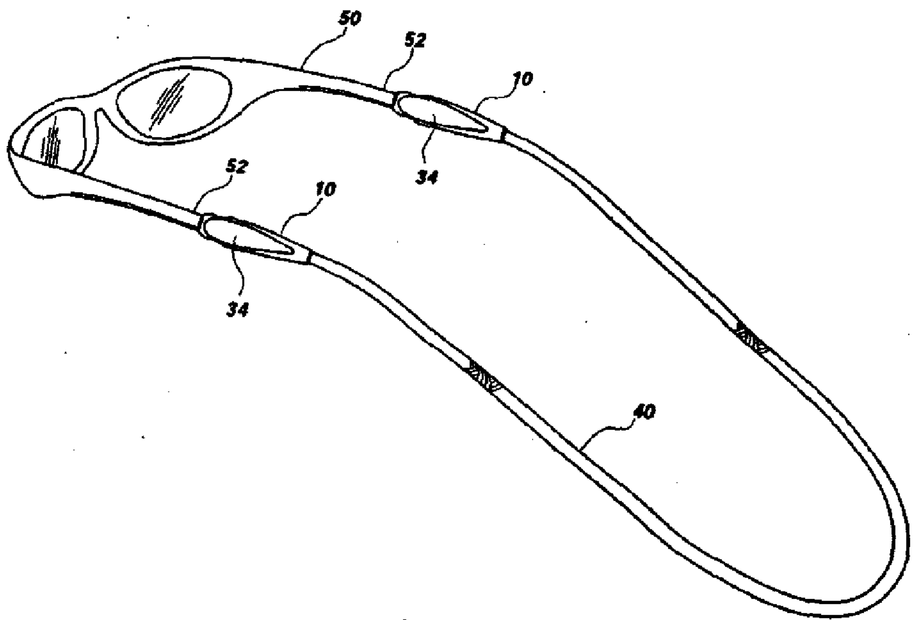

Fig. 13

UNITED STATES PATENT AND TRADEMARK OFFICE

CERTIFICATE OF CORRECTION

PATENT NO. : 6,709,100 B2

DATED : March 23, 2004

INVENTOR(S) : Edward Van Lee Kalbach

It is certified that error appears in the above-identified patent and that said Letters Patent is hereby corrected as shown below:

Drawings (cont'd),

Sheet 5 of 5 (containing FIG. 14) Replacement sheet showing all reference numerals

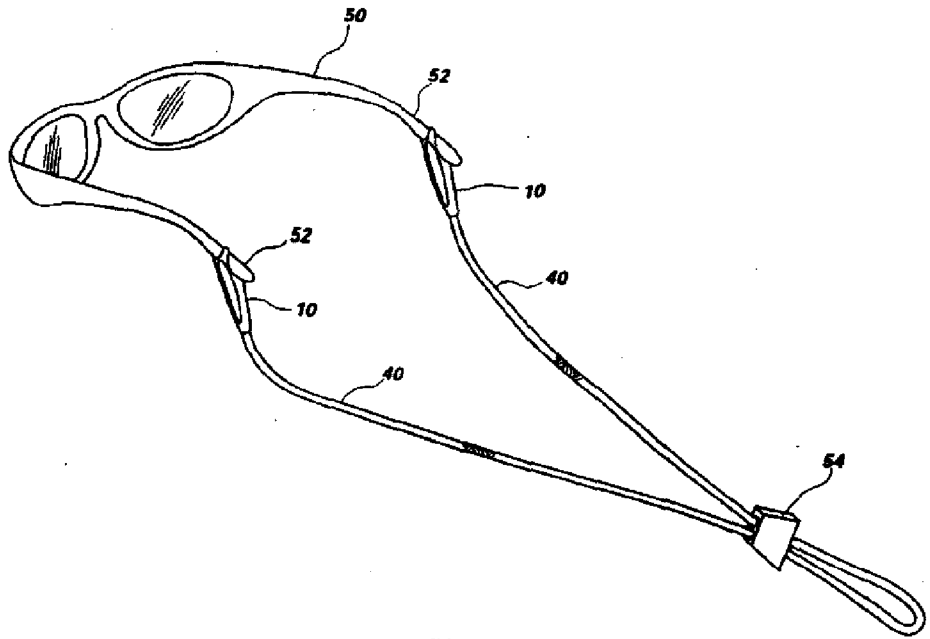

Fig. 14

UNITED STATES PATENT AND TRADEMARK OFFICE

CERTIFICATE OF CORRECTION

PATENT NO. : 6,709,100 B2
DATED : March 23, 2004
INVENTOR(S) : Edward Van Lee Kalbach It is certified that error appears in the above-identified patent and that said Letters Patent is hereby corrected as shown below:

Column 4,
Line 3, change "longitudinal axis 31" to -- longitudinal axis 30 --
Line 4, change "longitudinal axis 33" to -- longitudinal axis 30 --

Column 5,
Line 3, change "channel 10" to -- channel 14 --
Line 5, change "channel 10" to -- channel 14 --
Line 9, change "cord 14" to -- cord 40 --
Line 17, change "openings 14" to -- openings 16 and 17 -- and change "ports **24*aa*" to -- ports 24A** --
Line 34, delete the "," at the beginning of the line
Line 38, change "32 of the tunnel 28" to -- 30 of the tunnel 28 --
Line 49, change "retainer assembly 12" to -- retainer member 10 --

Signed and Sealed this

Eighth Day of March, 2005

JON W. DUDAS
*Director of the United States Patent and Trademark Office*